(12) United States Patent
Giladi

(10) Patent No.: US 9,954,717 B2
(45) Date of Patent: Apr. 24, 2018

(54) DYNAMIC ADAPTIVE STREAMING OVER HYPERTEXT TRANSFER PROTOCOL AS HYBRID MULTIRATE MEDIA DESCRIPTION, DELIVERY, AND STORAGE FORMAT

(71) Applicant: Futurewei Technologies, Inc., Plano, TX (US)

(72) Inventor: Alexander Giladi, Princeton, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 872 days.

(21) Appl. No.: 13/940,097

(22) Filed: Jul. 11, 2013

(65) Prior Publication Data

US 2014/0019587 A1    Jan. 16, 2014

Related U.S. Application Data

(60) Provisional application No. 61/670,483, filed on Jul. 11, 2012.

(51) Int. Cl.
*H04L 29/06* (2006.01)

(52) U.S. Cl.
CPC .. *H04L 29/06476* (2013.01); *H04L 29/06517* (2013.01); *H04L 65/4092* (2013.01);
(Continued)

(58) Field of Classification Search
CPC ............. H04L 65/608; H04L 29/06476; H04L 29/06517; H04L 65/60
See application file for complete search history.

(56) References Cited

U.S. PATENT DOCUMENTS

2002/0120741 A1* 8/2002 Webb .................. G06F 11/3093
                                                     709/225
2005/0138462 A1* 6/2005 Hunt .................... G06F 11/2007
                                                     714/4.4
(Continued)

FOREIGN PATENT DOCUMENTS

WO    WO 2013022470 A1 *  2/2013  ............ H04W 56/00

OTHER PUBLICATIONS

Information Technology-Dynamic Adaptive Streaming over HTTP (DASH)—Part 1: Media presentation description and segment formats, International Organization for Standardization (ISO)/International Electrotechnical Commission (IEC) document 23009-1:2012(E), First Edition, Apr. 1, 2012, 134 pages.

*Primary Examiner* — Jeong S Park
(74) *Attorney, Agent, or Firm* — Conley Rose, P.C.

(57) ABSTRACT

An apparatus comprising a memory, and a processor coupled to the memory and configured to obtain a Dynamic Adaptive Streaming over Hypertext Transfer Protocol (HTTP) (DASH) Media Presentation Description (MPD) from an HTTP server, wherein the MPD describes a media presentation as a combination of an HTTP source and a non-HTTP source. A computer program product comprising computer executable instructions stored on a non-transitory computer readable medium such that when executed by a processor, cause a network element (NE) to receive a Dynamic Adaptive Streaming over Hypertext Transfer Protocol (HTTP) (DASH) Media Presentation Description (MPD) from an HTTP server; and dynamically switch between a HTTP source and a non-HTTP source of the media presentation described according to the MPD.

13 Claims, 8 Drawing Sheets

(52) U.S. Cl.
CPC .......... *H04L 65/602* (2013.01); *H04L 65/608* (2013.01); *H04L 65/80* (2013.01)

(56) References Cited

U.S. PATENT DOCUMENTS

| | | | | |
|---|---|---|---|---|
| 2005/0240548 | A1* | 10/2005 | Fujioka | H04L 29/06027 |
| 2009/0252329 | A1* | 10/2009 | Casey | H04L 63/10 380/279 |
| 2010/0021132 | A1* | 1/2010 | Shiragaki | G11B 20/00086 386/248 |
| 2010/0030908 | A1* | 2/2010 | Courtemanche | G06F 17/3002 709/231 |
| 2011/0246609 | A1* | 10/2011 | Kim | H04L 65/4084 709/217 |
| 2013/0007814 | A1* | 1/2013 | Cherian | H04L 65/605 725/62 |
| 2013/0019025 | A1* | 1/2013 | Chaturvedi | H04L 29/06517 709/231 |
| 2013/0290493 | A1* | 10/2013 | Oyman | H04W 72/0413 709/219 |
| 2015/0288530 | A1* | 10/2015 | Oyman | H04W 56/00 370/312 |

* cited by examiner

DYNAMIC ADAPTIVE STREAMING OVER HYPERTEXT TRANSFER PROTOCOL AS HYBRID MULTIRATE MEDIA DESCRIPTION, DELIVERY, AND STORAGE FORMAT

CROSS-REFERENCE TO RELATED APPLICATIONS

The present application claims priority to U.S. Provisional Patent Application 61/670,483, filed on Jul. 11, 2012 by Alexander Giladi, and entitled "Use of DASH as Hybrid Multirate Media Description, Delivery, and Storage Format," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A media content provider or distributor may deliver various media contents to users over a network using different encoding schemes suited for different device and network conditions. The media contents may be divided into smaller segments of representations for easier transmission, and representations may be converted to various other representations to suit different user devices. A media content provider may transmit media content to client(s) using Hypertext Transfer Protocol (HTTP) by employing a Dynamic Adaptive Streaming over HTTP (DASH) protocol. When employing DASH, a media content provider may, upon request, transmit a media presentation description (MPD) file to the client. The MPD file may describe the media content as segments, and may describe how such segments may be utilized to present the media content to a user. For example, the MPD file may describe segment timing, segment multiplexing (e.g. interrelation between audio segment and video segment timings), and/or Uniform Resource Locator (URL) information indicating where such segments may be obtained. DASH is discussed further in International Organization for Standardization (ISO)/International Electrotechnical Commission (IEC) document 23009-1:2012(E) entitled "Information technology-Dynamic adaptive streaming over HTTP (DASH)—Part 1: Media presentation description and segment formats," which is incorporated herein by reference as if reproduced in its entirety.

SUMMARY

In one embodiment, the disclosure includes an apparatus comprising a memory, and a processor coupled to the memory and configured to obtain a DASH MPD from an HTTP server, wherein the MPD describes a media presentation as a combination of an HTTP source and a non-HTTP source.

In another embodiment, the disclosure includes a computer program product comprising computer executable instructions stored on a non-transitory computer readable medium such that when executed by a processor, cause a network element (NE) to receive a Dynamic Adaptive Streaming over Hypertext Transfer Protocol (HTTP) (DASH) Media Presentation Description (MPD) from an HTTP server, and dynamically switch between a HTTP source and a non-HTTP source of the media presentation described according to the MPD.

In yet another embodiment, the disclosure includes a method comprising generating, by a Hypertext Transfer Protocol (HTTP) server, a Dynamic Adaptive Streaming over Hypertext Transfer Protocol (HTTP) (DASH) Media Presentation Description (MPD), wherein the MPD comprises a non-HTTP Uniform Resource Locator (URL), and wherein the MPD describes an attribute utilized for retrieving a media presentation, and delivering the MPD to a DASH client.

In yet another embodiment, the disclosure includes requesting, by a Dynamic Adaptive Streaming over Hypertext Transfer Protocol (HTTP) (DASH) client, a DASH Media Presentation Description (MPD) from a HTTP server, obtaining the MPD from the HTTP server, wherein the MPD describes a media presentation as a combination of an HTTP source and a non-HTTP source, and dynamically switching between the HTTP source and the non-HTTP source of the media presentation described according to the MPD.

In yet another embodiment, the disclosure includes a server comprising a memory, and a processor coupled to the memory and configured to generate a Dynamic Adaptive Streaming over Hypertext Transfer Protocol (HTTP) (DASH) Media Presentation Description (MPD), wherein the MPD comprises a non-HTTP Uniform Resource Locator (URL), and wherein the MPD describes an attribute utilized for retrieving a media presentation, and deliver the MPD to a DASH client.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The DASH protocol may be capable of additional functions outside of the pure HTTP streaming that is specified in the ISO/IEC 23009-1:2012 standard. For example, the DASH protocol may be used as a file format to, for example, facilitate the reuse of streamed content, or the DASH protocol may be used as an interface to multicast networks to, for example, switch between multicast streams and HTTP representations of media. Other additional uses for the DASH protocol that are outside of the DASH standard may include point-to-point, and broadcast protocols, as well as the use of DASH for transformation requests.

Disclosed herein are systems and methods that facilitate an expanded use of DASH. The disclosed techniques may provide a way for non-HTTP and HTTP sources to be used together in DASH. The disclosed technique may facilitate the presentation of media content derived from a combined HTTP source and local storage device. The disclosed technique may also facilitate the presentation of media content derived from a combined real-time network source and HTTP source, as well as facilitating media content transformations. The term "source" as used in this disclosure may be defined as a media or data resource received by a client via a communication protocol, e.g. a HTTP source may be accessed via HTTP, a non-HTTP source may be any resource not accessed via HTTP, a file may be accessed by reading from a local file system, and a multicast may be accessed by joining a multicast group.

Figure 1:
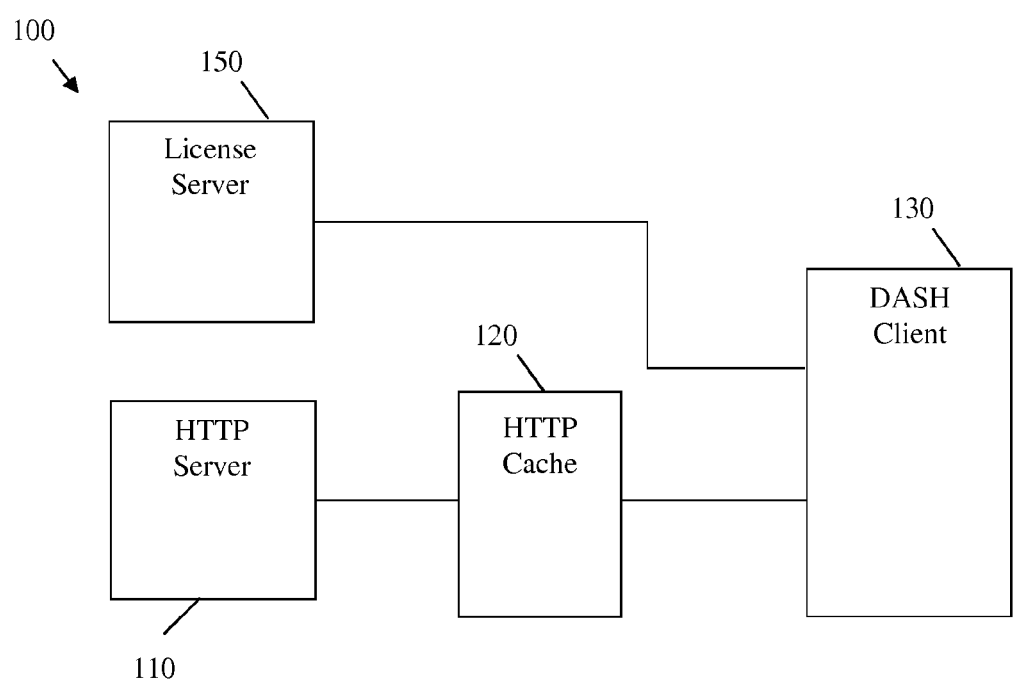
FIG. 1 is a schematic diagram of an embodiment of a DASH enabled network architecture.
Figure 2:
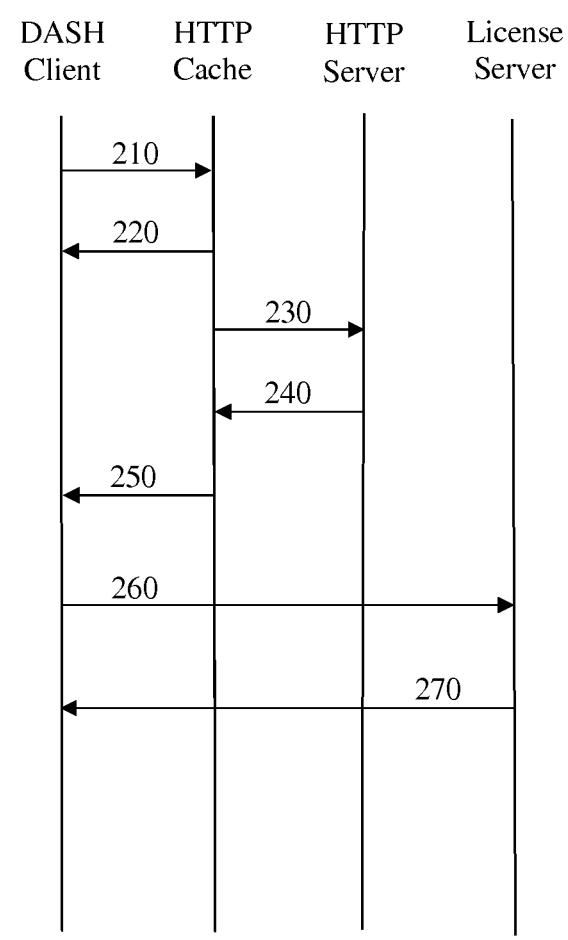
FIG. 2 is a protocol diagram of an embodiment of a DASH enabled network.

FIG. 1 is a schematic diagram of an embodiment of a DASH enabled network 100 architecture that communicates according to the protocol diagram of FIG. 2. Network 100 may comprise an HTTP server 110, a license server 150, an HTTP cache 120, and a DASH client 130 arranged as shown in FIG. 1. HTTP server 110 may be any device configured to service HTTP requests from DASH client 130. License server 150 may be any device configured to service key and/or initialization vector (IV) requests from DASH client 130. HTTP server 110 and license server 150 may be located on the same device, on different devices, or spread amongst a cluster of devices. For example, HTTP server 110 and/or license server 150 may comprise dedicated servers positioned in a data center. As another example, HTTP server 110 and/or license server 150 may operate as virtual machines (VMs) in a cloud computing environment. The HTTP server 110 may also be part of a content provider network or may be a node in a content distribution network (CDN). HTTP server 110 may populate an MPD file with information indicting URLs and/or a URL scheme, which may allow DASH client 130 to locate segment data. HTTP server 110 may further populate the MPD file with information indicting URLs and/or a URL scheme, which may allow DASH client 130 to locate the associated keys and/or IVs at the license server 150. HTTP server 110 may further populate the MPD file with any information DASH client 130 may require to present the data, such as period information, timing, segment format information, multiplexing information, etc. HTTP server 110 may then transmit the MPD file to DASH client 130 upon request. HTTP server 110 may also transmit segments and/or message authentication codes (MACs) to DASH client 130 upon request.

HTTP cache 120 may be any device configured to temporarily store information for rapid access by DASH client 130. For example, HTTP cache 120 may be a browser cache, which may be a software based cache stored on DASH client 130, a proxy cache, which may be a shared cache on DASH client 130's network, a gateway cache, which may be a shared cache installed in the same network as license server 150 and/or HTTP server 110, or combinations thereof. HTTP cache 120 may store segment data, MPD files, MACs and/or any other data DASH client 130 may require to present the media content.

DASH client 130 may be any device configured to obtain media content via a DASH protocol and present such media content to a user, such as a mobile phone, personal computer (PC), Internet Protocol (IP) television (TV), IP TV set top box, laptop PC, internet radio device, tablet PC, media storage device, etc. The DASH client 130 may present the content via a web browser, a media player, a video presenter, or any other program suitable for video and/or audio playback. The DASH client 130 may directly present the media content (e.g. visual data via a screen, audio data via a speaker, etc.) and/or may save and/or transmit the media content to other device(s) for presentation. The DASH client 130 may request an MPD file, for example via an HTTP GET request. The DASH client 130 may then review the MPD file to determine URLs for keys, IVs, MACs, ciphers, segments, etc. The DASH client 130 may also obtain any keys, IVs, MACs, ciphers, segments, etc., needed to display the media content, for example via an HTTP GET request(s) to the license server 150 and/or HTTP server 110. Upon receiving the necessary information, the DASH client 130, may decrypt the segment(s) with the cipher(s), key(s), and/or IVs, authenticate the segments(s) with the MAC, select and/or multiplex the segment data as directed by the MPD, and present the media content to the user and/or transmit the media content to another device for storage and/or presentation to the user. It should be noted that while only one DASH client 130 is shown for purposes of clarity, there may be many DASH clients 130 that may request the same and/or different media presentations from an HTTP server 110 at any specified time.

FIG. 2 is a protocol diagram of an embodiment of DASH communication method 200. At step 210, DASH client 130 may request data from an HTTP server 110 via an HTTP cache 120. The data may comprise a MPD, media content segments, or any other DASH associated data. Upon receiving requests from DASH client 130, the cache 120 may determine whether the requested data is already stored in the cache 120. If the data is stored, at step 220 the cache 120 may respond to the DASH client 130 request without forwarding the request to server 110. If the requested data is not stored in the cache 120, at step 230 the cache 120 may forward the request to HTTP server 110. At step 240, the HTTP server 110 may respond by transmitting the requested data to the cache 120. The cache 120 may forward the response to the requesting DASH client 130 at step 250, and/or save any data from the response for faster access at a later use by the same or a different DASH client 130. Based on data received from the cache 120, at step 260, DASH client 130 may request associated keys and/or IVs from the license server 150. At step 270, upon receiving the required components from license server 150, DASH client 130 may decrypt media content segments, arrange the media content contained in the segments according to a MPD, and present the media content to the user.

Figure 3:
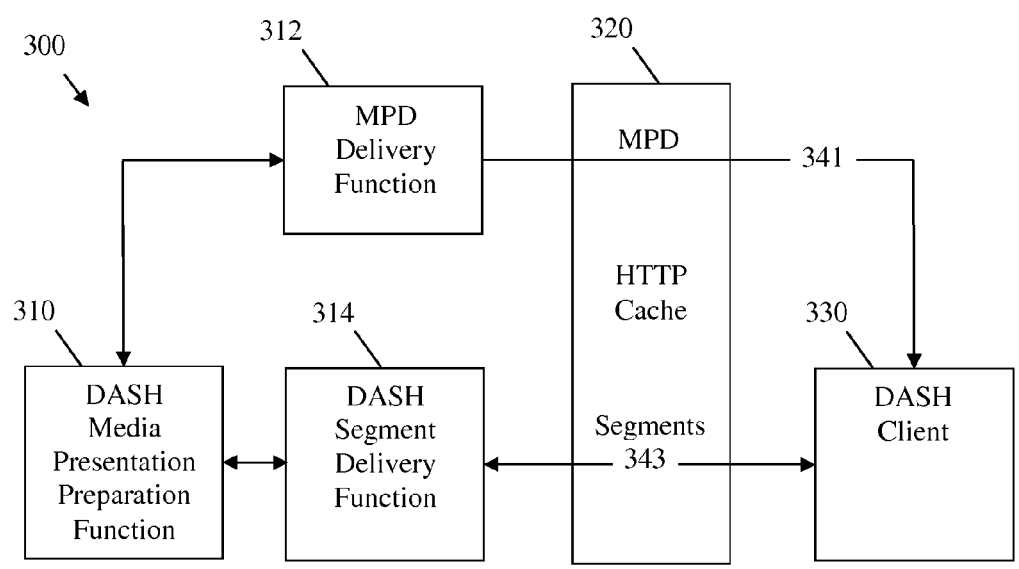
FIG. 3 is a schematic diagram of an embodiment of a DASH delivery process model.

FIG. 3 is a schematic diagram of an embodiment of a DASH delivery process model 300. Model 300 may comprise a DASH media presentation preparation function 310, which may be implemented on a HTTP server, such as HTTP server 110, a content provider server, etc. Model 300 may further comprise a MPD delivery function 312 and a DASH segment delivery function 314, which may be implemented on a HTTP server such as HTTP server 110. Model 300 may further comprise a HTTP cache 320 and a DASH client 330, which may be substantially similar to HTTP cache 120 and DASH client 130, respectively. DASH media presentation preparation function 310, MPD delivery function 312, and DASH segment delivery function 314 may operate to transmit an MPD 341 and associated segments 343 to DASH client 330 via HTTP cache 320.

DASH media presentation preparation function 310 may be configured to prepare a media presentation for viewing by a DASH client 330. For example, the DASH media presentation preparation function 310 may receive data regarding media content from a CDN and may prepare an MPD to describe the media content. The MPD may list URLs for keys, IVs, ciphers, segments, and/or MACs. The MPD may list such URLs as static addresses and/or as functions that may be used to determine associated URLs. The MPD may be created using Extensible Markup Language (XML). An MPD may comprise information for one or more periods. Each period may comprise one or more adaption sets. Each adaptation set may comprise one or more representations. Each representation may comprise one or more segments. A period may comprise timing data and may represent a content period during which a consistent set of encoded versions of the media content is available (e.g. a set of available bitrates, languages, captions, subtitles etc. that do not change). An adaptation set may represent a set of interchangeable encoded versions of one or several media content components. For example, a first adaptation set may comprise a main video component, a second adaptation set may comprise a main audio component, a third adaptation set my comprise captions, etc. An adaption set may also comprise multiplexed content, such as combined video and audio. A representation may describe a deliverable encoded version of one or more media content components, such as an ISO base media file format (ISO-BMFF) version, a Moving Picture Experts Group (MPEG) version two transport system (MPEG-2 TS) version, etc. A representation may describe, for example, any needed codecs, encryption, and/or other data needed to present the media content. A client 330 may dynamically switch between representations based on network conditions, device capability, user choice, etc., which may be referred to as adaptive streaming. Each segment may comprise the media content data, may be associated with a URL, and may be retrieved by the client 330, e.g. with an HTTP GET request. Each segment may contain a pre-defined byte size (e.g., 1,000 bytes) and/or an interval of playback time (e.g., 2 or 5 seconds) of the media content. A segment may comprise the minimal individually addressable units of data that can be downloaded using URLs advertised via the MPD. The periods, adaptation sets, representations, and/or segments may be described in terms of attributes and elements, which may be modified to affect the presentation of the media content by the client device 330. Upon preparing the MPD, the DASH media presentation preparation function 310 may deliver the MPD to the MPD delivery function 312.

The client 330 may request the MPD 341 be delivered by the MPD delivery function 312. The MPD delivery function 312 may respond with the MPD 341 via the HTTP cache 320. Based on the address data in the MPD, the client 330 may request appropriate segments 343 from the DASH segment delivery function 314. It should be noted that segments 343 may be retrieved from a plurality of DASH segment delivery functions 314 and/or from a plurality of URLs and/or physical locations. The client 330 may present the retrieved segments 343 based on the instructions in the MPD 341.

Figure 4:
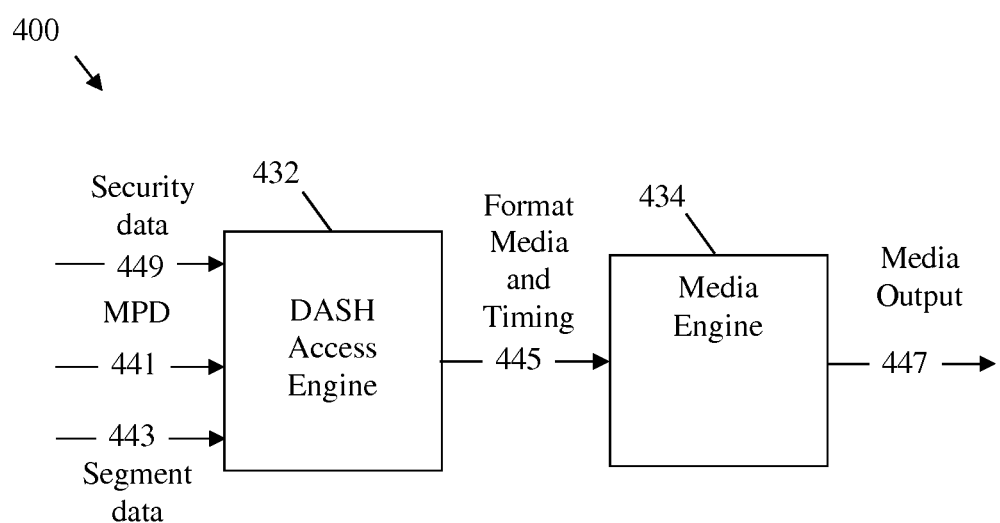
FIG. 4 is a schematic diagram of an embodiment of a DASH client process model.

FIG. 4 is a schematic diagram of an embodiment of a DASH client process model 400. Model 400 may comprise a DASH access engine 432 and a media engine 434, which may be implemented in a DASH client, such as DASH clients 130 and/or 330. DASH access engine 432 may be any component configured to interpret an MPD, request media data, and receive such data. For example, DASH access engine 432 may request an MPD 441, such as MPD 341, from a MPD delivery function, such as MPD delivery function 312. Based on the MPD 441, DASH access engine 432 may also request segment data 443 from a dash segment delivery function, such as dash segment delivery function 314. Also based on the MPD 441, the DASH access engine 432 may request any security data 449, such as MACs from an HTTP server to authenticate the segment data 443 and/or ciphers, IVs, and/or keys from a license server such as license server 150 to decrypt the segment data 443. Once the segment data 443 has been decrypted and authenticated, the DASH access engine 432 may forward the format, media, and/or timing 445 to the media engine 434. The media engine 434 may be any component configured to receive the format, media, and/or timing 445 and prepare media output 447 based on the format, media, and/or timing 445. The media output 447 may be stored and/or transmitted to a component for presentation to a user (e.g. a screen, speaker, etc.)

Figure 5:
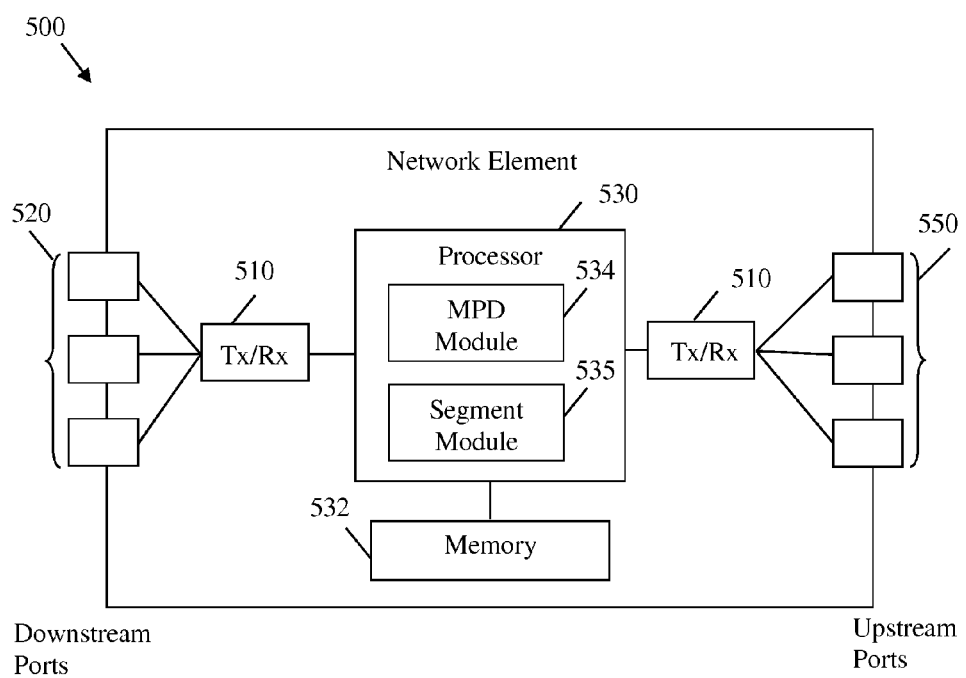
FIG. 5 is a schematic diagram of an embodiment of a NE that may act as a DASH server.

FIG. 5 is a schematic diagram of an embodiment of a NE 500 that may act as a DASH server, such as HTTP server 110, a license server 150, a DASH media presentation preparation function 310, a MPD delivery function 312, and/or a DASH segment delivery function 314, within a network and/or model such as network 100 and/or model 300, and may be configured to generate MPDs and/or transmit segments to a DASH client such as DASH client 130, and/or 330. NE 500 may be implemented in a single node or the functionality of NE 500 may be implemented in a plurality of nodes in a CDN, or other content based network. In some embodiments, NE 500 may also act as other node(s) in network 100 and/or model 300. One skilled in the art will recognize that the term NE encompasses a broad range of devices of which NE 500 is merely an example. NE 500 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 500. For instance, the features/methods in the disclosure may be implemented using hardware, firmware, and/or software installed to run on hardware. The NE 500 may be any device that transports frames through a network, e.g., a switch, router, bridge, server, a client, etc. As shown in FIG. 5, the NE 500 may comprise transceivers (Tx/Rx) 510, which may be transmitters, receivers, or combinations thereof. A Tx/Rx 510 may be coupled to plurality of downstream ports 520 (e.g. downstream interfaces) for transmitting and/or receiving frames from other nodes and a Tx/Rx 510 coupled to plurality of upstream ports 550 (e.g. upstream interfaces) for transmitting and/or receiving frames from other nodes, respectively. A processor 530 may be coupled to the Tx/Rxs 510 to process the frames and/or determine which nodes to send frames to. The processor 530 may comprise one or more multi-core processors and/or memory devices 532, which may function as data stores, buffers, etc. Processor 530 may be implemented as a general processor or may be part of one or more application specific integrated circuits (ASICs) and/or digital signal processors (DSPs). Processor 530 may comprise an MPD module 534 and/or a segment module 535. The MPD module 534 may prepare an MPD and/or forward the MPD toward a client upon request. The segment module 535 may forward segments toward the client upon request. In an alternative embodiment, the MPD module 534 and/or a segment module 535 may be implemented as instructions stored in memory 532, which may be executed by processor 530. In another alternative embodiment, the MPD module 534 and the segment module 535 may be implemented on separate NEs. The downstream ports 520 and/or upstream ports 550 may contain electrical and/or optical transmitting and/or receiving components.

It is understood that by programming and/or loading executable instructions onto the NE 500, at least one of the processor 530, MPD module 534, segment module 535 downstream ports 520, Tx/Rxs 510, memory 532, and/or upstream ports 550 are changed, transforming the NE 500 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 6:
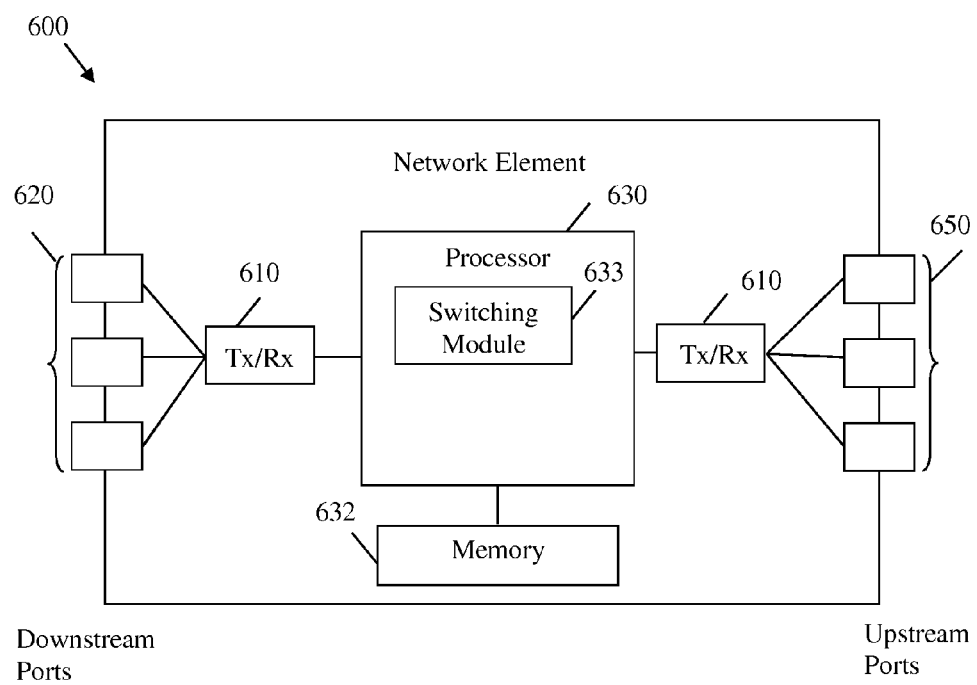
FIG. 6 is a schematic diagram of an embodiment of a NE that may act as a DASH client.

FIG. 6 is a schematic diagram of an embodiment of a NE 600 that may act as a DASH client, such as DASH client 130 and/or DASH client 330, and may be configured to implement DASH client model 400. NE 600 may comprise downstream ports 620, upstream ports 650, Tx/Rxs 610, a processor 630, and a memory 632, which may be substantially similar to downstream ports 520, upstream ports 550, Tx/Rxs 510, processor 530, and memory 532. NE 600 may further comprise a switching module 633, which may be configured to determine if segments of a desired media presentation are locally stored, in what quality those segments are stored, and if the segments must be retrieved from a different source that is not local. Switching module 633 may also be configured to switch between media presentation multicast streams and corresponding HTTP sources, as well as define input and output parameters of a media presentation for a transformation. In an alternative embodiment, the switching module 633 may be implemented as instructions stored in memory 632, which may be executed by processor 630. In another alternative embodiment, the switching module 633 may be implemented on separate NEs.

Figure 7:
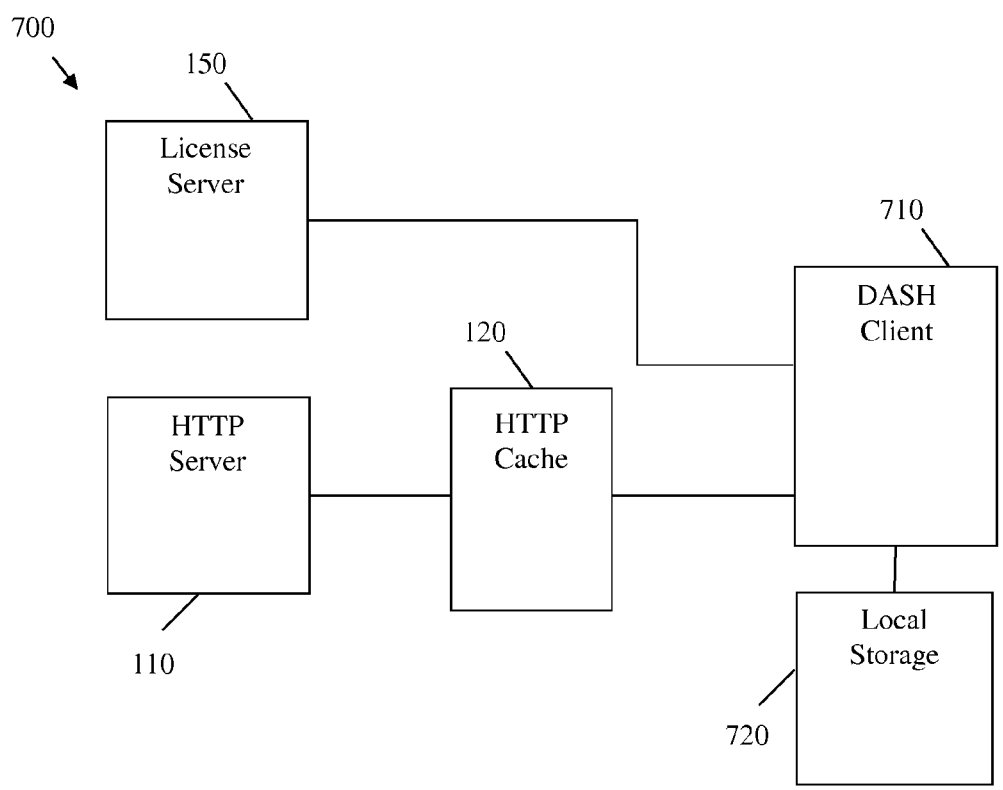
FIG. 7 is a schematic diagram of an embodiment of a hybrid DASH enabled network architecture.

FIG. 7 is a schematic diagram of an embodiment of a hybrid DASH enabled network 700 architecture. Hybrid network 700 may operate according to the standard of the DASH protocol, as well as outside of the standardized DASH protocol. Hybrid network 700 may utilize DASH defined structures, e.g. MPD and index files, in a manner not standardized in the DASH protocol. Hybrid network 700 may stream content in a manner substantially similar to network 100, and as such, may comprise components substantially similar to those of network 100, namely HTTP server 110, license server 150, and HTTP cache 120. Hybrid network 700 may further comprise a modified DASH client 710, and storage 720. DASH client 710 may have the capabilities of requesting, receiving, and/or presenting media content according to a DASH protocol using HTTP streaming or non-HTTP streaming content. Storage 720 may be comprised of one or more solid-state drives, disk drives, and/or combinations thereof that may be used for non-volatile storage of data, and may be implemented as read only memory (ROM), random access memory (RAM), or any combination thereof.

When streaming HTTP content using a DASH protocol, DASH client 710 may operate in a manner substantially similar to DASH client 130. However, DASH client 710 may comprise the additional capability of locally recording content to storage 720 that is being streamed over HTTP according to a DASH protocol. The streamed content may be locally recorded and stored on storage 720 in a DASH file format (DASH/FF). The locally recorded content may comprises a low resource method of subsequent playback, or in other words, the locally recorded content may allow a DASH client 130 to consume a reduced amount of network resources when the content is played back subsequent to its first playing.

An embodiment of hybrid network 700 may be created by employing generalized URLs beyond the current HTTP/HTTP Secure URL limitations. The generalized URLs may comprise non-HTTP URLs, e.g. file://, combined with World Wide Web Consortium (W3C) Media Fragments syntax used to address specific subsets of the stream for a multiplexed representation such as MPEG-2 TS. For example, for an MPEG-2 TS media file, addressing may be accomplished by defining tracks as packet identifiers (PIDs), similar to the way in which the tracks are defined for DASH index segments. Allowing non-HTTP URL schemes may also allow the use of representations that are of the same type, or are mutually exclusive and non-switchable. Such a network may also support the use of non-HTTP URLs and HTTP URLs being used in combination. The following may comprise one exemplary embodiment of a URL for a non-HTTP representation and W3C Media Fragments track addressing syntax for a video with a corresponding English audio track from a multiplexed MPEG-2 TS file:

file://localhost/VoD/SomeMovie/b2345K.ts#track=481&track=482.

Hybrid network 700 may also employ User Datagram Protocol (UDP) addressing. Using UDP addressing, the previous exemplary embodiment employing file:// would become the following:

udp://234.5.6.7:5001#track=481&track=482.

Currently, UDP addressing schemes are highly application specific and their implementation is largely a matter of design choice. To establish uniformity across systems, a newly defined scheme, e.g. udp+mp2t://, may be adopted.

For exemplary purposes, MPEG-2 TS will be considered. MPEG-2 TS may be a low-delay streaming format that does not have good built-in random access properties. However, when used in conjunction with a DASH index file, MPEG-2 TS may have excellent random access properties and trick mode support. When a multi-rate file format is needed, a DASH MPD and index files may provide the necessary infrastructure, whether one or more single program transport streams (SPTS) are used.

In an embodiment of a system utilizing DASH/FF, DASH client 710 may, when playing content subsequent to its first playing, first seek to retrieve content segments from a local stored non-HTTP representation, e.g. previously streamed data now stored on storage 720. In one embodiment, if a required content segment is not available in a locally stored non-HTTP representation, DASH client 710 may seek to retrieve the corresponding segment in a traditional HTTP representation using DASH protocol before returning to the local storage to attempt to retrieve the next content segment. In this scenario, the HTTP representation may be referred to as a "representation of last resort," in other words, if a non-HTTP representation of a content segment is not available and a HTTP representation of the content segment is not available, the content segment may not be playable at that time. In an alternate embodiment, if a required content segment is available in a locally stored non-HTTP representation, but that representation was not originally streamed and recorded at the highest possible quality, DASH client 710 may seek to retrieve and record the corresponding content segment in a HTTP representation at a higher quality. DASH client 710 may retrieve corresponding higher quality HTTP representation content segments until all content segments stored locally as non-HTTP representations are stored in their highest available quality.

In an alternate embodiment of a system using DASH/FF, a device, e.g. a home network gateway, may be used to store a complete set of content segments for a given media asset and stream the content segments to other devices utilizing the DASH protocol. The content segments may comprises a complete multi-rate set stored on the device so that content segments may be delivered in a multitude of qualities, determined by network conditions In the above embodiments of a system utilizing DASH/FF for recording, a media asset may exist in one or more languages with corresponding subtitles. The asset may be downloaded and locally stored as non-HTTP representations at its highest quality in only one of the languages, while subtitles and audio for the other languages are only available via HTTP representations. In such a case, resynchronization at the receiving edge and rate adaptation may only be necessary on the representations of the asset not locally stored.

In an alternative embodiment of a system using DASH/FF, a DASH client 710 may dynamically switch between HTTP and non-HTTP representations of content segments based on need. DASH client 710 may switch to a HTTP representation of a content segment only when the HTTP representation is within its availability window, i.e. the period of time for which that respective HTTP representation is made available for streaming. Conversely, the DASH client 710 may switch to a locally stored non-HTTP representation of a content segment without availability window restriction.

In yet another alternative embodiment of a system using DASH/FF, it may be desirable for a DASH client 710 to switch between content sources at the segment level rather than the representation level. Individual segments within a MPD representation may be mutually switchable if both the HTTP and non-HTTP representation containing the respective segments are in the same AdaptationSet, and therefore share the same time alignment and random access properties. Additionally, the handling of read errors in DASH client 710 may be adapted to facilitate content switching at the segment level. Conventionally, a HTTP GET error may be an error indicating the current representation has no more available segments. However, when accessing locally stored non-HTTP representations and switching at the segment level, a file read error may simply signal to DASH client 710 that the same segment may need to be requested from the corresponding HTTP representation of the content. Furthermore, a "representation of last resort" may be inferred from the URL scheme used to identify representations available from a plurality of access methods. For example, if content of a single representation is available at least partially via locally stored non-HTTP files and completely via HTTP, a MPD BaseURL employing file:// may indicate that the respective representation may fail, but may not require a significant amount of network resources, whereas an http:// URL in the same MPD BaseURL may be the "representation of last resort." In some embodiments, although switching may be taking place at the segment level, a representation level switch in terms of, for example, bandwidth, resolution, etc. may be necessary and may be handled by changing the level at which BaseURL may appear, e.g. Representation.BaseURL vs. MPD.BaseURL. In an alternative embodiment, failover properties may be explicitly defined through the addition of a priority indicating attribute to the BaseURL, as shown below:

<BaseURL priority="0" >http://cdn1.example.com/</BaseURL>
<BaseURL priority="0" >http://cdn2.example.com/</BaseURL>
<BaseURL priority="1" >file://localhost/</BaseURL>.

Using such a priority indicating system may facilitate a DASH client 710 requesting the highest priority URL first, followed by the URL having one priority level lower if the higher priority URL fails. A priority indicating system may also allow rules to be enforced to control the order in which HTTP servers are accessed, for example, enforce business rules, control traffic, etc. In addition to a URL for the "representation of last resort," one or more preferred URLs may be designated, as well as URLs that may not be last resort, but may also not be preferred.

Figure 8:
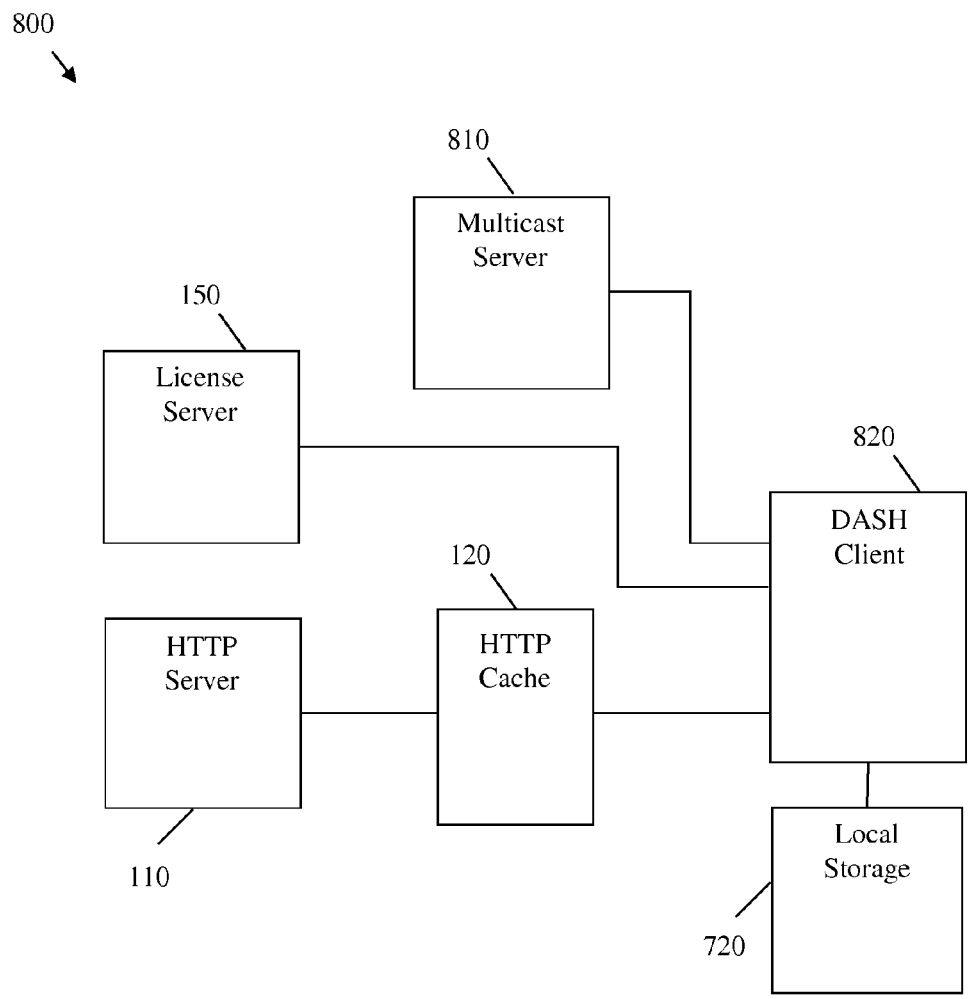
FIG. 8 is a schematic diagram of an embodiment of a combined DASH and multicast network architecture.

FIG. 8 is a schematic diagram of an embodiment of a combined DASH and multicast (DASH/MC) network architecture. DASH/MC network 800 may comprise HTTP Server 110, HTTP Cache 120, License Server 150, Local Storage 720, a Multicast Server 810, and DASH Client 820. HTTP Server 110, HTTP Cache 120, License Server 150, and Local Storage 720 may be substantially similar to embodiments previously described herein. Multicast Server 810 may be any network element with sufficient computing power to serve as a multicast streaming source server. DASH Client 820 may be a DASH client substantially similar to client 130, 330, and/or client 710. DASH Client 820 may have the additional capability of receiving, processing, and presenting media from a multicast stream. The DASH/MC network 800 may be facilitated by a framework created using non-HTTP URLs, introduced above. Conventional multicasts may be accomplished by utilizing UDP-based streaming of MPEG-2 TS encoded media. These multicasts may frequently be utilized for live streaming, and their use may generally be preferred over HTTP alternatives. In DASH/MC network 800, DASH may be used for multiple purposes, including, for example, time-shifting, personal video recorder applications, instant channel acquisition by utilizing the initialization segment and latest available media segment, as well as targeted advertisement at a per-subscriber level instead of the per-town limitation imposed on conventional multicast streams.

In DASH/MC network 800, utilizing a combination of multicast and HTTP representations of media, a DASH client 820 switching between representations may comprise leaving one multicast group and joining a new multicast group. It may not be possible to determine when to leave or join a multicast group, so information such as time alignment, bandwidth, and maximum segment duration may be utilized to provide the information necessary for buffering the multicast streams. If more than one multicast of a given media content is available, the streams may not be synchronized to facilitate seamless switching between the streams. A difference in delays between multicasts streams may be compensated for by utilizing the presentationTimeOffset attribute in the MPD for timeline mapping.

Multiple reasons may exist for DASH client 820 to switch between a multicast stream coming from Multicast Server 810 and an HTTP representation of media from an HTTP Server 110. For example, an obscure or infrequently used representation may only be available via HTTP and not multicast, forcing DASH client 820 to retrieve the representation from HTTP Server 110. Another example may be the retrieval of non-real-time resources, which will be further discussed later. Yet another example may be a multicast failure that requires switching to an HTTP representation until multicast is available again. A failure may comprise a plurality of events, including network packet losses between Multicast Server 810 and DASH Client 820. A failure may occur at the time a multicast stream is joined. Joining the multicast may occur at a random location in the middle of a segment i, this would result in segment i+1 being the first segment to be correctly acquired from multicast. Therefore, to immediately acquire the content, the initialization segment and segment i may be requested via HTTP from HTTP Server 110, and the remainder of the media delivered via multicast from Multicast Server 810, with the HTTP representation remaining as the "representation of last resort."

Unlike the previous discussion of video on demand content, the availability of multicast streaming content is not dependent on an availability window, but rather the size of the buffer being used by DASH Client 820 to buffer the stream from Multicast Server 810. In one embodiment, the necessary buffer may be implemented in Local Storage 720. Additionally, delays in multicast streams may be different such that "now" in a multicast stream is one content segment ahead of a HTTP "now." Accordingly, switching from an HTTP representation to a multicast stream may only be possible when viewing the respective content in real time, with parallel buffering of the multicast stream taking place, e.g. one segment is both buffered from multicast and requested via HTTP. Seamless switching between a multicast stream and an HTTP representation may be made possible by adding additional buffering to the multicast stream so that the buffered content matches the availability window of the corresponding segment in the HTTP representation. To facilitate switching between live multicast streams and HTTP representations, it may be beneficial to introduce additional attributes to the MPD BaseURL. These attributes may comprise a relative position of the corresponding non-HTTP availability window, and the presentationTimeOffset previously mentioned. It may be necessary to signal the presentationTimeOffset in each MPD BaseURL. The following is one example embodiment indicating the relative position of the non-HTTP availability window and is not intended to be limiting. As one of ordinary skill in the art will see, many different approaches may be utilized:

```
<BaseURL priority="0">http://cdn1.example.com/</BaseURL>
<BaseURL priority="0">http://cdn2.example.com/</BaseURL>
<BaseURL priority="1"
    availabilityOffset="PT2S" availabilityDuration="PT4S">
    udp://234.5.6.7:5001</BaseURL>.
```

In the above example, availabilityOffset and availabilityDuration indicate the availability window of the media relative to one of the HTTP representations, e.g. the HTTP representation calculated from the MPD.

A multicast stream may be advantageous due to its efficiency compared to a standard HTTP stream of real-time, however multicasting non-realtime resources may be impractical, and it may be more desirable for those resources to be retrieved using HTTP representations. To signify whether a given URL in a MPD should be used for non-realtime resources, an additional attribute may be introduced to the BaseURL as is shown by the example below:

```
<BaseURL priority="0" >http://cdn1.example.com/</BaseURL>
<BaseURL priority="0" >http://cdn2.example.com/</BaseURL>
<BaseURL priority="1"
    availabilityOffset="PT2S" availabilityDuration="PT4S"
    nonRealTime="no">udp://234.5.6.7:5001</BaseURL>.
```

In multicast streams, a segment name in a MPD BaseURL may be immaterial since the URL is specified using an IP address and port number. W3C fragment addressing syntax and query strings for file URLs may be equally immaterial. As a result, BaseURL groups may be created, such that only BaseURLs with the same group identification may be combined to allow for BaseURL concatenation.

Although the use of a combined multicast stream and HTTP source has been discussed for exemplary purposes, as one of ordinary skill in the art will see, the techniques disclosed herein may equally apply to a plurality of real-time network communication protocols or real-time network streams that may have the general functionality of providing access to live media presentation streaming, such as Real-time Transport Protocol (RTP), File Delivery over Unidirectional Transport (FLUTE), and/or peer-to-peer streaming protocols, as well as to a wide variety of topologies, e.g. peer-to-peer, unicast, e.g. point-to-point, multicast, and/or broadcast.

In addition to the above-mentioned functions, the DASH protocol may also be implemented in an in-network transformation device (INTD). An INTD may ingest audio and/or video media assets, perform requested operations, e.g. re-multiplexing, re-encryption, transcoding, etc., and output the resulting media to a CDN. An INTD may also ingest textual media, e.g. subtitles, and auxiliary data, e.g. indexes and metadata, perform requested operations, and output the resulting data. A DASH MPD may be utilized to specify the input formats an INTD may receive, as well as the output formatted the INTD should generate. Example of INTD devices may be a device that accepts MPEG-2 TS multicasts as an input and outputs segments in a plurality of adaptive bitrate formats, or a mobile operator's base station that transforms inputs according to formats and bitrates that the provider allows at the particular site.

The DASH protocol currently exists as an input specification, but it is limited to the DASH standard of HTTP and HTTP Secure. Introducing generalized URLs, as discussed above, may allow a DASH manifest to serve as an input to an INTD, providing the INTD with a description of the content and the operations necessary to acquire the content. In other words, an INTD may serve as a form of modified DASH client that may ingest one or more media content representations via varying protocols employing the non-HTTP frameworks previously discussed herein.

The DASH protocol may be utilized as an output specification for describing a desired content destination by further generalizing the URLs accepted in a DASH MPD. For example, utilizing Secure Copy (SCP), File Transfer Protocol (FTP), file writes, etc. may allow the use of uploads via HTTP and facilitate the use of DASH as an output specification. In an embodiment, a method may be implemented for use as an output specification. An example for an HTTP representation is shown below:

<BaseURL method="PUT">http://cdn1.example.com/</BaseURL>.

The specification of additional items such as user credentials may be necessary to use DASH as an output specification, and such items would be a matter of design choice dependent on the intended use of a particular embodiment of this disclosure.

In another embodiment, if an input format for some content is known, it may be compared to the description of the output format to determine what actions should be taken on that content. For example, if an input is encoded as MPEG-2 TS and the output description specifies ISO-BMFF, the input will be re-multiplexed. Similarly, if codec parameters in an output description of some content vary from that of the corresponding input, transcoding may be performed; if encryption is different between input and output, re-encryption may be required; and if only a subset of the input is required for the output, e.g. only one video track and one audio track from a stream containing one video track and two audio tracks, the need may be indicated by the URL located in the MPD and the proper tracks may be extracted and output.

Such a system utilizing DASH for file transformations may be implemented by establishing a unique link between the input and output representations, such as a globally unique identifier of a representation. This identifier may comprise a complete Uniform Resource Identifier (URI) of the input MPD, its digital signature (using XML Standard signature), a concatenation of MPD.id, Period.id, AdaptationSet.id, and Representation.id variable of the input MPD. For content that is to be used for adaptive streaming, it may also be necessary to generate a manifest. An indication of which streaming standard the content may be used with may be made in the MPD using the Multipurpose Internet Mail Extension (MIME) type of the manifest, as shown in the example below that may comprise a DASH MPD request for creation of an APPLE® HTTP Live Streaming manifest:

<OutputManifest mimeType="vnd.apple.mpegURL" name="ManifestName.m3u8"/>.

Additionally, the DASH MPD, modified as described herein, may contain all the information necessary for describing a collection of content, and may allow immediate prediction and preloading of content on CDN nodes, thereby having the potential to significantly reduce latency. Unique identification of a representation and/or segment name passed from one CDN to a second CDN may also enable the second CDN to predict future requests as well.

As one of ordinary skill in the art will see, although the MPEG-2 TS encoding format was frequently used for exemplary purposes, the above discussion may not be limited to any one particular encoding format, but may instead be implemented using any suitable encoding format, e.g. ISO-BMFF, all of which may be embodiments encompassed by this disclosure.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A Dynamic Adaptive Streaming over Hypertext Transfer Protocol (DASH) client comprising:
    a memory; and
    a processor coupled to the memory and configured to:
        receive a DASH Media Presentation Description (MPD) from a DASH server, the MPD comprising a Hypertext Transfer Protocol (HTTP) uniform resource locator (URL) that describes an HTTP source, a non-HTTP URL that describes a non-HTTP source, and a priority indicator instructing first priority use of the non-HTTP URL and second priority use of the HTTP URL when the non-HTTP URL fails, the MPD describing a real-time network stream, the MPD describing a second HTTP source that serves as a failover source for the real-time network stream, the MPD comprising an attribute that facilitates dynamic switching between the real-time network stream and the HTTP source, the attribute comprising a first indicator of an availability window for the real-time network stream, and the attribute further comprising a second indicator that signals whether a source is suitable for providing non-real-time resources,
        attempt to receive a real-time media presentation from the real-time network stream before attempting to retrieve the real-time media presentation from the HTTP source, and
        retrieve non-real-time resources from the HTTP source.

2. The DASH client of claim 1, wherein the processor is further configured to:
    use the MPD to describe a transformation to be made to a media presentation;
    use the MPD to formulate an input data description and an output data description, wherein the input data description describes an input data content and an operation required to acquire the input data content, and wherein the output data description describes an output data content and a destination location for the output data content; and
    compare the input data description to the output data description to determine a chain of actions performed on the input data content to correctly form the output data content.

3. The DASH client of claim 2, wherein the MPD comprises a globally unique identifier that uniquely links the input data content to the output data content, and wherein the globally unique identifier comprises a Uniform Resource Identifier (URI) of an input MPD, a corresponding digital signature, and a concatenation of variables of the input MPD.

4. The DASH client of claim 1, wherein the priority indicator is independent of a streaming status.

5. The DASH client of claim 1, wherein the non-HTTP URL points to a multicast server.

6. The DASH client of claim 1, wherein the processor is further configured to use the HTTP URL when the non-HTTP URL is associated with a stored segment that does not meet a quality standard.

7. The DASH client of claim 1, wherein the processor is further configured to switch from an HTTP representation to a non-HTTP representation when the HTTP representation is outside its availability window.

8. A computer program product comprising computer executable instructions stored on a non-transitory computer readable medium such that when executed by a processor, the instructions cause a Dynamic Adaptive Streaming over Hypertext Transfer Protocol (DASH) client to:
    receive a DASH media presentation description (MPD) from a DASH server, the MPD comprising a Hypertext Transfer Protocol (HTTP) uniform resource locator (URL) that describes an HTTP source, a non-HTTP URL that describes a non-HTTP source, and a priority indicator instructing first priority use of the non-HTTP URL and second priority use of the HTTP URL when the non-HTTP URL fails, the MPD describing a real-time network stream, the MPD describing a second HTTP source that serves as a failover source for the real-time network stream, the MPD comprising an attribute that facilitates dynamic switching between the real-time network stream and the HTTP source, the attribute comprising a first indicator of an availability window for the real-time network stream, and the attribute further comprising a second indicator that signals whether a source is suitable for providing non-real-time resources,
    attempt to receive a real-time media presentation from the real-time network stream before attempting to retrieve the real-time media presentation from the HTTP source, and
    retrieve non-real-time resources from the HTTP source.

9. The computer program product of claim 8, wherein the MPD comprises an attribute that facilitates dynamic switching between the real-time network stream and the second HTTP source, and wherein the attribute comprises an indicator that signals whether a source is suitable for providing a non-real-time resource.

10. A method comprising:
    generating, by a Dynamic Adaptive Streaming Hypertext Transfer Protocol (DASH) server, a DASH media presentation description (MPD), the MPD comprising a Hypertext Transfer Protocol (HTTP) uniform resource locator (URL) that describes an HTTP source, a non-HTTP URL that describes a non-HTTP source, and a priority indicator instructing first priority use of the non-HTTP URL and second priority use of the HTTP URL when the non-HTTP URL fails, the MPD describing a real-time network stream, the MPD describes a second HTTP source that serves as a failover source for the real-time network stream, the MPD comprising an attribute that facilitates dynamic switching between the real-time network stream and the HTTP source, the attribute comprising a first indicator of an availability window for the real-time network stream, and the attribute further comprising a second indicator that signals whether a source is suitable for providing non-real-time resources, and
    delivering the MPD to a DASH client.

11. The method of claim 10, wherein input data comprise a first MPD that describes input data content, wherein output data comprise a second MPD that describes output data content, and wherein the method further comprises transforming the input data content into the output data content according to a comparison of the first MPD to the second MPD.

12. A method comprising:
requesting, by a Dynamic Adaptive Streaming over Hypertext Transfer Protocol (DASH) client, a DASH Media Presentation Description (MPD) from a DASH server;
obtaining the MPD from the DASH server, the MPD describes a media presentation as a combination of a Hypertext Transfer Protocol (HTTP) source and a non-HTTP source, the MPD comprises an HTTP uniform resource locator (URL) that describes the HTTP source, a non-HTTP URL that describes the non-HTTP source, and a priority indicator instructing first priority use of the non-HTTP URL and second priority use of the HTTP URL when the non-HTTP URL fails, the MPD describes a real-time network stream, the MPD describes a second HTTP source that serves as a failover source for the real-time network stream, the MPD comprises an attribute that facilitates dynamic switching between the real-time network stream and the HTTP source, the attribute comprises a first indicator of an availability window for the real-time network stream, and the attribute further comprises a second indicator that signals whether a source is suitable for providing non-real-time resources, attempt to receive a real-time media presentation from the real-time network stream before attempting to retrieve the real-time media presentation from the HTTP source, and
retrieve non-real-time resources from the HTTP source.

13. A Dynamic Adaptive Streaming over Hypertext Transfer Protocol (DASH) server comprising:
a memory; and
a processor coupled to the memory and configured to:
generate a DASH media presentation description (MPD), the MPD comprising a Hypertext Transfer Protocol (HTTP) uniform resource locator (URL) that describes an HTTP source, a non-HTTP URL that describes a non-HTTP source, and a priority indicator instructing first priority use of the non-HTTP URL and second priority use of the HTTP URL when the non-HTTP URL fails, the MPD describing a real-time network stream, the MPD describing a second HTTP source that serves as a failover source for the real-time network stream, the MPD comprising an attribute that facilitates dynamic switching between the real-time network stream and the HTTP source, the attribute comprising a first indicator of an availability window for the real-time network stream, and the attribute further comprising a second indicator that signals whether a source is suitable for providing non-real-time resources, and
deliver the MPD to a DASH client.

* * * * *